United States Patent [19]
Osborne et al.

[11] Patent Number: 6,005,551
[45] Date of Patent: Dec. 21, 1999

[54] OFFLINE FORCE EFFECT RENDERING

[75] Inventors: Timothy Osborne; Manolito E. Adan; Bin An, all of Woodinville, Wash.

[73] Assignee: Microsoft Corporation, Redmond, Wash.

[21] Appl. No.: 08/845,540

[22] Filed: Apr. 25, 1997

[51] Int. Cl.[6] .................................................. G09G 5/08
[52] U.S. Cl. ............................ 345/161; 364/190; 463/38
[58] Field of Search ................................... 345/161, 156, 345/157, 163; 340/172.5; 364/190; 463/38, 30

[56] References Cited

U.S. PATENT DOCUMENTS

| | | | |
|---|---|---|---|
| 3,818,457 | 6/1974 | Schleifer | 340/172.5 |
| 5,103,404 | 4/1992 | McIntosh | 318/568.22 |
| 5,414,337 | 5/1995 | Schuler | 318/561 |
| 5,589,854 | 12/1996 | Tsai | 345/161 |
| 5,691,898 | 11/1997 | Rosenberg et al. | 364/190 |
| 5,734,373 | 3/1998 | Rosenberg et al. | 345/161 |
| 5,739,811 | 4/1998 | Rosenberg et al. | 345/161 |
| 5,742,278 | 4/1998 | Chen et al. | 345/156 |

FOREIGN PATENT DOCUMENTS

| | | | |
|---|---|---|---|
| 0 626 634 A2 | 11/1994 | European Pat. Off. | G03F 3/00 |
| WO97/12337 | 4/1997 | WIPO | G06F 19/00 |

*Primary Examiner*—Matthew Luu
*Assistant Examiner*—Jeff Piziali
*Attorney, Agent, or Firm*—Ronald M. Anderson

[57] ABSTRACT

A processor in a haptic joystick renders force effects that are applied to control handle gripped by a user. A plurality of force effects specified by a host computer to the processor are stored in a random access memory (RAM) that is coupled to the processor. Further, a plurality of force effects are stored in a read only memory (ROM) that is coupled to the processor. The processor employs a scheduler to render the force effects in a specified order, for specified time intervals. The scheduler controls how the force effects are rendered, i.e., sequentially, concatenated, and/or superimposed. A play list employed by the scheduler indicates for each increment of a servo clock when each force effect should be rendered by the processor. The scheduler has a round robin queue that can implement at least five types of effects, including: behavioral, synthesized, wave table, variable parameter, and process list.

16 Claims, 9 Drawing Sheets

OFFLINE FORCE EFFECT RENDERING

FIELD OF THE INVENTION

The present invention generally relates to an apparatus and a method for applying a feedback force to a user of a device, and more specifically, to an apparatus and a method for rendering haptic effects generated by local processor in the device that are indicated to the local processor by a host computer through a communication link.

BACKGROUND OF THE INVENTION

Force feedback can simulate the sense of touch (referred to as a haptic effect) for a user of a control device, such as a joystick, by generating a force that may be responsive to the user's input or alternatively, produce a feedback force that simulates a condition in a virtual world environment. Typically, a force feedback device employs a servo motor that has a servo loop rate, which is at least an order of magnitude faster than the device's ability to mechanically transmit a force to the user. For example, the user of a force feedback device with a relatively stiff mechanism, e.g., having a maximum rate of 50 Hz, will require a servo loop rate of 500 Hz or better if the user is to perceive a realistic haptic effect.

Historically, a host computer has been employed to render the calculations for the servo loop so that a servo motor could transmit or apply a desired haptic effect to the user. In the prior art, as each effect is rendered, it is downloaded by the host computer to the force feedback device for transmission to the user. Even though many host computers are capable of rendering the calculations in real time, a concurrent application implemented by the host computer that is computationally intensive (employing extensive graphics and sound) can cause a latency in the calculation and subsequent transmission of the haptic effect to the user. Whenever a latency occurs, the effect is no longer synchronized with the concurrent application and the user will not experience the effect in real time. The sense of reality intended by the haptic is thus adversely affected due to such problems, as well as potential instability of closed loop effects such as springs.

There are two techniques commonly employed in the prior art for rendering force feedback effects to the user. The first technique employs a force feedback device that has a memory capable of storing an effect used in an application; the effect is activated by the application sending a command to the haptic feedback device, or in response to the user activating a control on the device. The host computer only provides the parameters for the stored effect, and the device produces the force output based on the supplied parameters.

In the second technique, the host computer and the force feedback device share a common "world view" or co-simulation. The host computer renders the graphics and sound of a virtual world and indicates the characteristics of objects and their physics in the virtual world to the force feedback device. The device is employed to render the physics of the virtual world and report the disposition of movable objects of interest to the host. Significantly, both approaches have inherent problems in rendering real time haptic effects. The first approach requires the host to continuously interact with the force feedback device in order to vary the time period of each haptic effect and schedule the transmission of the effect to the user. The second approach requires large amounts of processing power to be concentrated in the force feedback device for calculating the physics and position of objects disposed in the virtual world.

Clearly, an approach is required that avoids the problems of the above prior art techniques for rendering force feedback effects. It would be preferable to schedule a plurality of indicated haptic effects for generation by the force feedback device so that these effects can be implemented without requiring extensive communication between the device and the host computer. An effect that is to be employed by an application, if not stored in the force feedback device, should be downloadable from the host computer to the processor in the device. The host computer should be able to indicate an effect that should be applied to the processor when an application has called for the effect to be generated based upon an identification code assigned to the effect. A scheduler in the device should control the order in which the effects are rendered by the processor without any further interaction being required between the host computer and the device. It should be possible to schedule sequential, concatenated, or superimposed effects to enable the rendering of extremely complex effects. Currently, no known prior art haptic control system implements this approach to achieve the real-time rendering of effects.

SUMMARY OF THE INVENTION

In accord with the present invention, a force feedback device is defined that is responsive to a request from a host computer to generate scheduled force effects. The force feedback device includes a member adapted to be grasped by a user of the force feedback device. A prime mover is coupled to the member and produces a force that acts on the member. A processor coupled to the prime mover renders the force effect, producing a drive signal that is coupled to the prime mover. The drive signal causes the prime mover to generate a force corresponding to the force effects. A scheduler implemented by the processor schedules the force effects so that they are generated during time intervals requested by the host computer. A communication link couples the host computer to the processor and conveys the request to render the force effects from the host computer to the processor in order to schedule the force effects.

The scheduler establishes an order of execution for the force effects in response to commands received from the host computer. Preferably, the scheduler establishes a start time and a stop time for each force effect generated in response to commands received from the host computer.

A servo clock is employed to determine a duration for each of the time intervals. The scheduler responds to the servo clock to control the duration of a force effect. A plurality of the force effects can be executed concurrently, causing a superimposition of the plurality of the force effects. In general, one force effect can comprise a plurality of other force effects.

A memory is provided for storing a profile of a force effect initially received from the host computer and an identifier that is assigned to the profile. The scheduler employs the unique identifier for each force effect that is requested from the host computer when scheduling the force effects. For example, to modify a force effect, the host computer transmits the unique identifier and a modification of a parameter of the profile that was previously stored to the processor, and the processor employs the modification of the parameter when rendering the force effect.

The processor can receive a plurality of force effect profiles from the host computer that are combined into a single force effect by the scheduler. The single force effect is then assigned a unique identifier.

Also included in the device is a memory that stores a table of predefined force effect profiles. Each of the profiles is assigned a unique identifier used by the scheduler in identifying each predefined force effect that is included in the scheduled force effects to be generated.

Each force effect belongs to one of a plurality of different classes. The plurality of different classes include a behavior class, a wave table class, a synthesized class, a variable parameter class, and a process list class.

Also included in the force feedback device is a switch that is coupled to the processor. The scheduler maps a force effect to the switch so that the force effect is rendered by the processor when the switch is actuated. The processor receives a request from the host computer indicating the force effect that is to be mapped to the switch. The scheduler can immediately cause the force effect mapped to the switch to be rendered and generated when the switch is actuated and then stop the force effect from being generated when the switch is no longer actuated.

Preferably, the communication link comprises a game port and a musical instrument digital interface port. Alternatively, the communication link comprises a universal serial bus port.

In a preferred form of the force feedback device, a plurality of prime movers are coupled to the member. At least one of the plurality of prime movers acts on the member to produce each force effect.

Also included is a sensor for producing a signal indicative of whether the user is gripping the member. The processor is coupled to the sensor and responds to the signal by preventing the prime mover from producing any force effect when the user is not gripping the member.

A superimposed force effect comprising multiple force effects that are executed simultaneously is among the plurality of scheduled force effects controlled by the scheduler. In addition, a sequential force effect comprising multiple force effects that are executed sequentially, and a concatenated force effect comprising multiple force effects that are executed sequentially and have a predetermined envelope are among the plurality of scheduled effects controlled by the scheduler. The envelope controls an amplitude of the multiple force effects that are executed sequentially.

A further aspect of the present invention is directed to a method for controlling a device that generates force effects. The method includes steps that are generally consistent with the functions implemented by the elements of the force feedback device discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4:
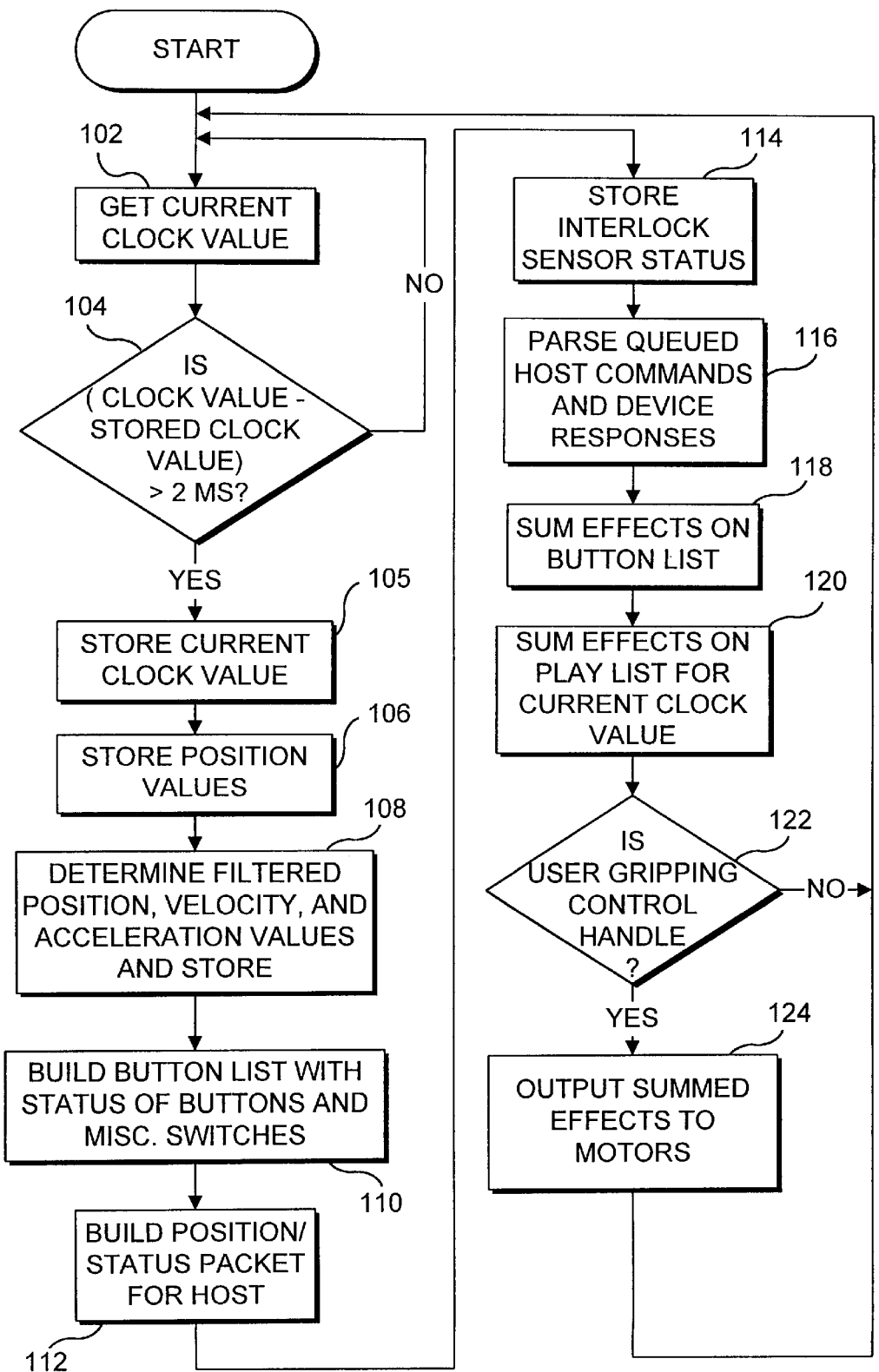
Figure 5A:
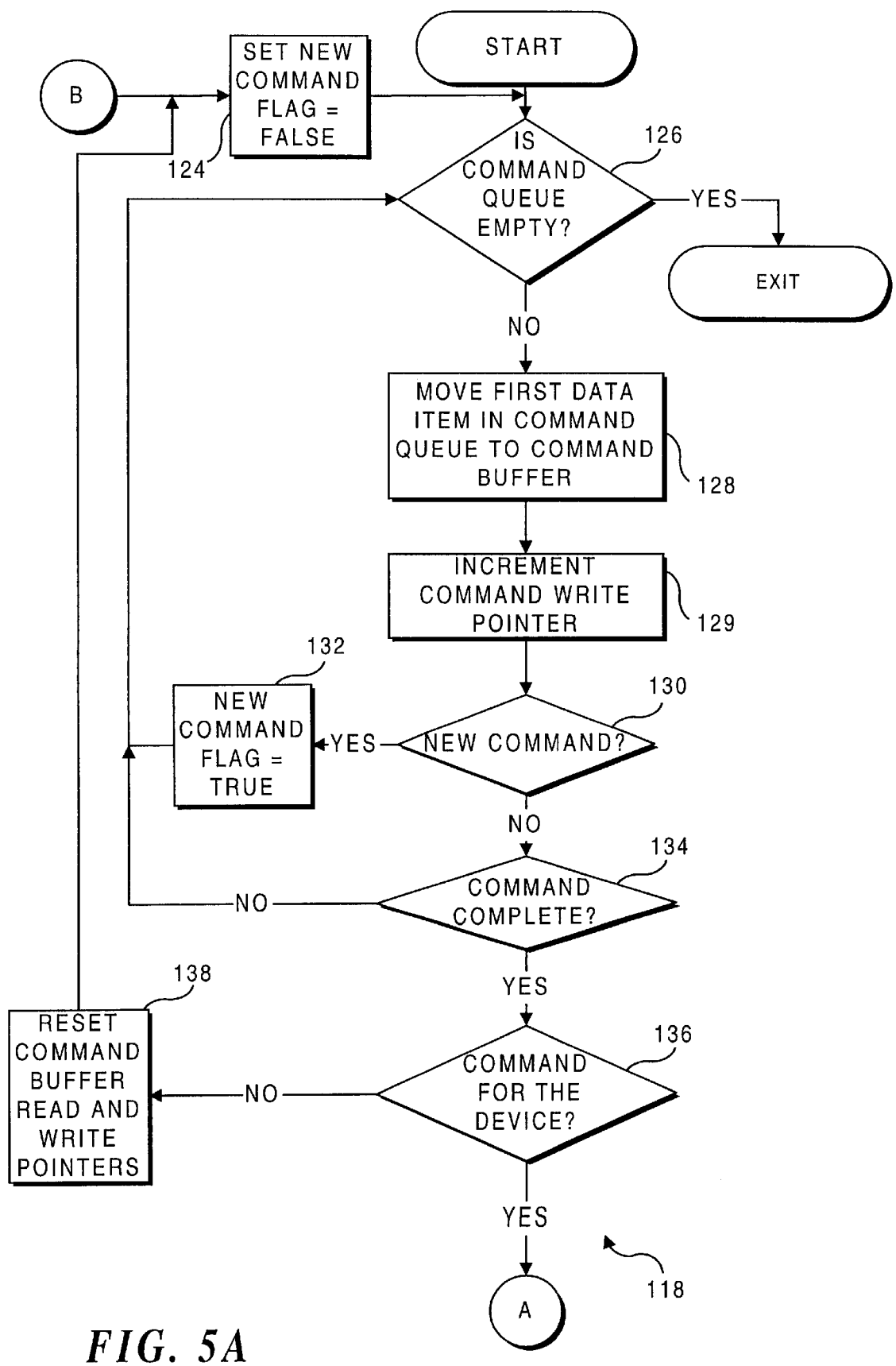
Figure 5B:
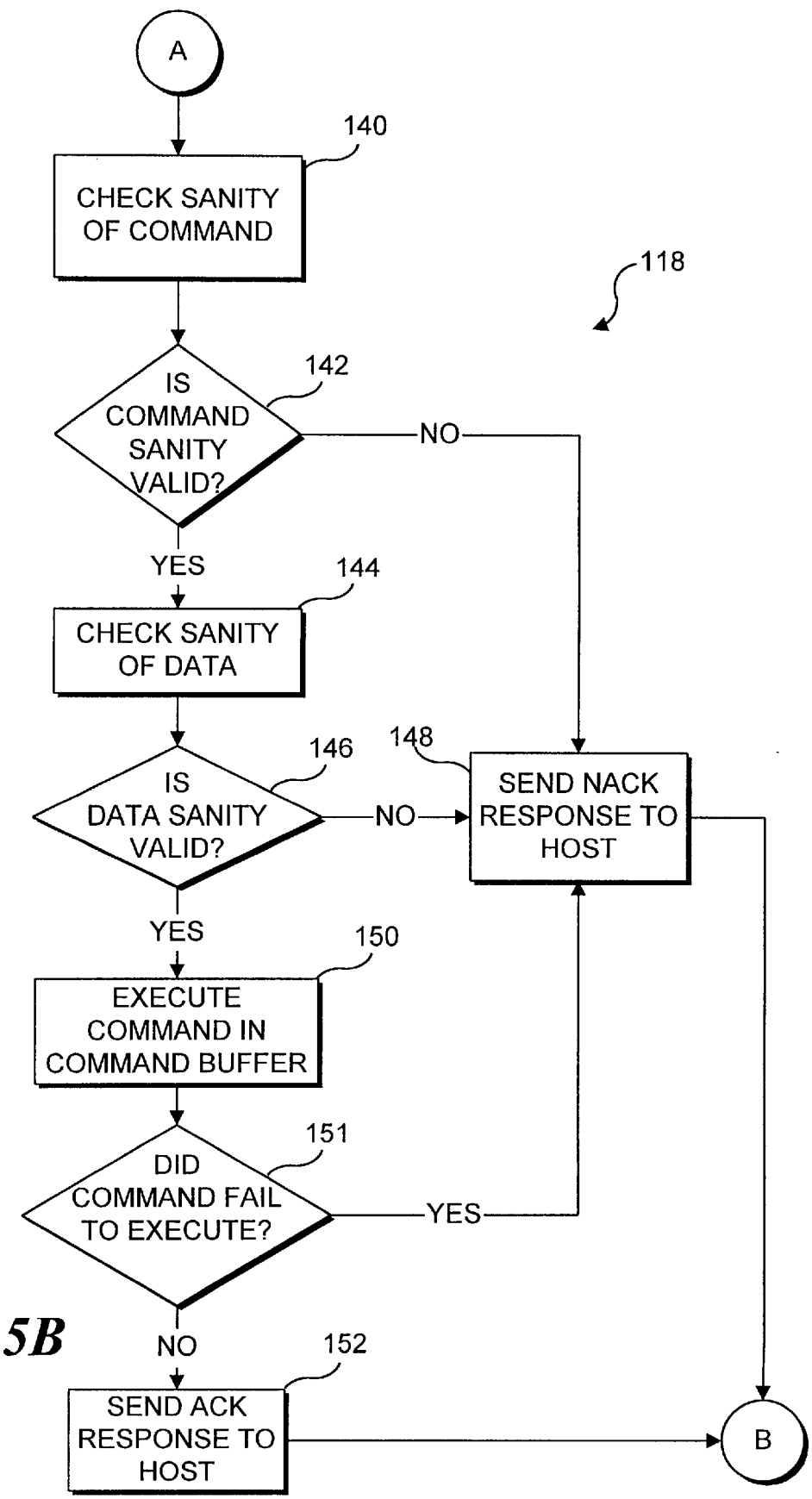
Figure 6:
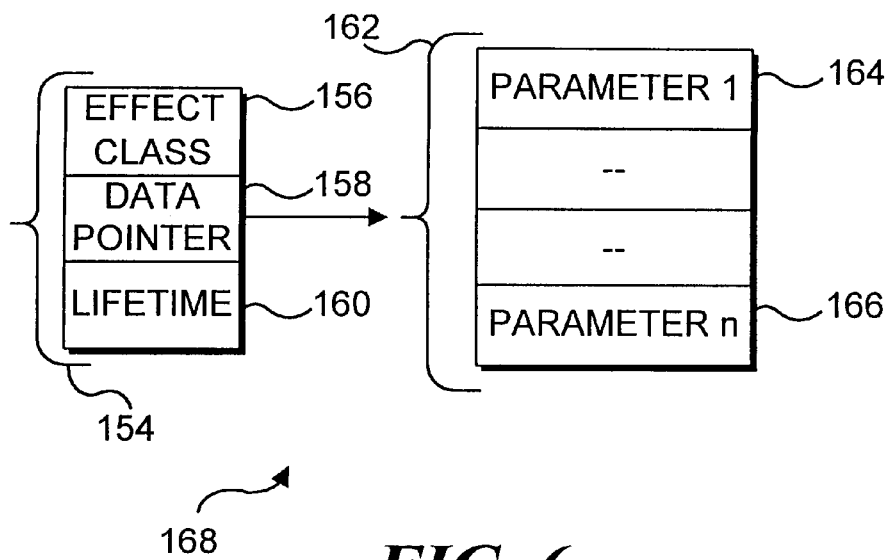
Figure 7:
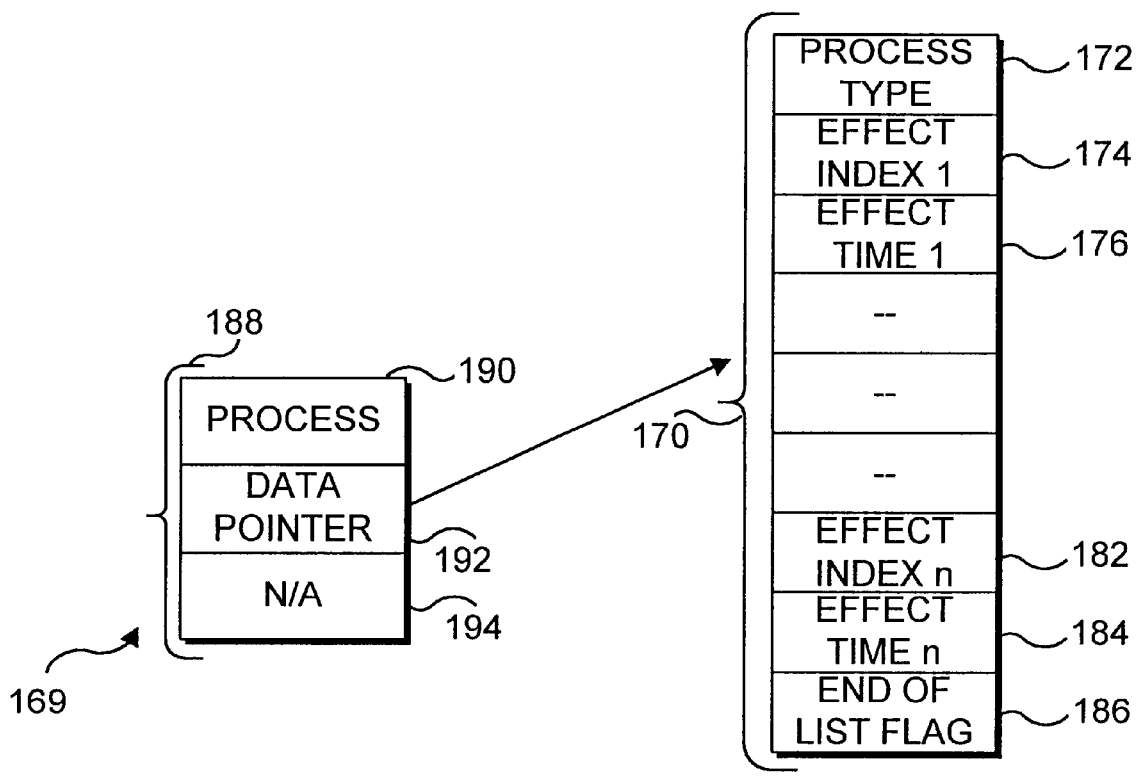
Figure 8:
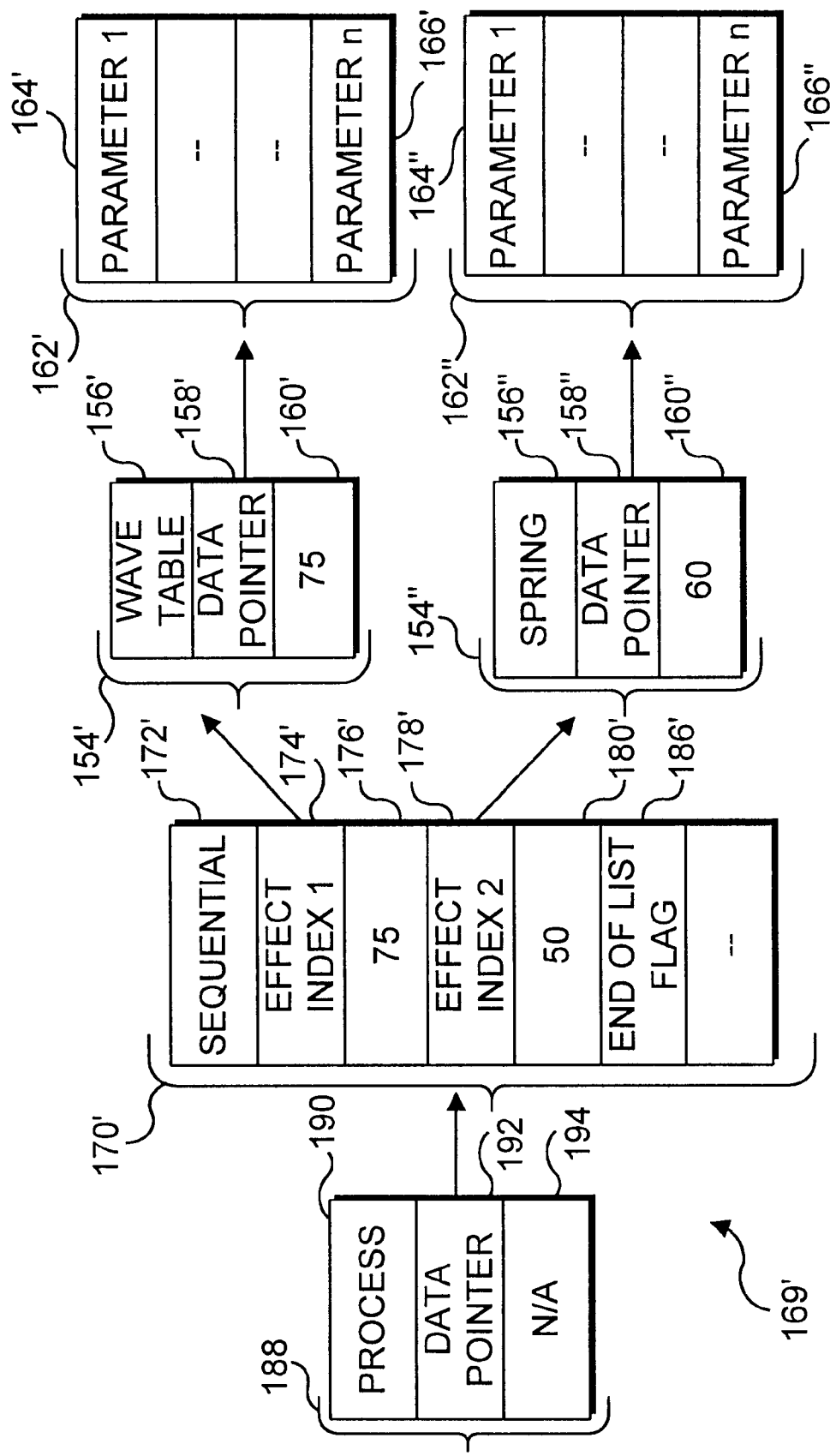
Figure 9:
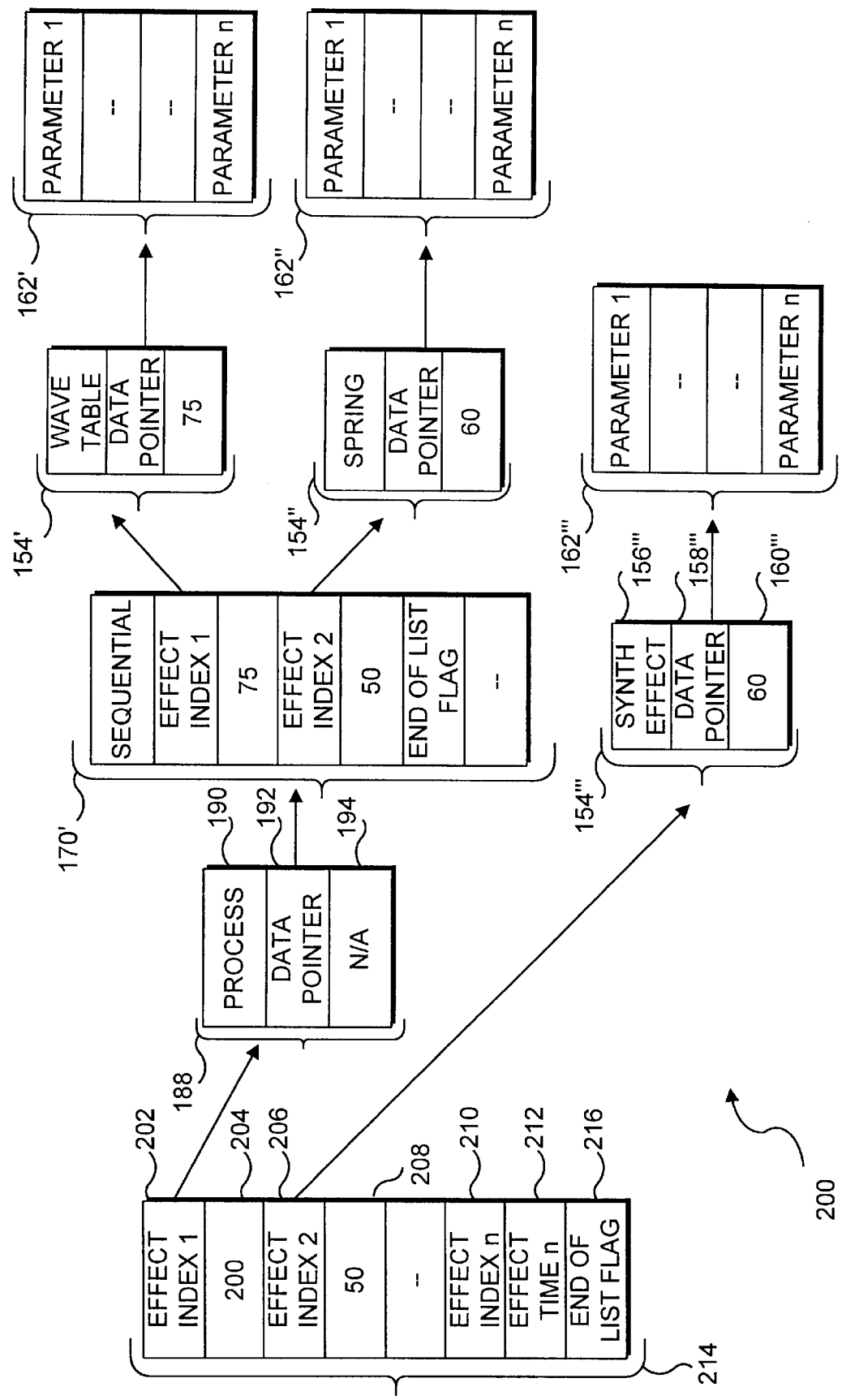

FIGS. 4, 5A, and 5B are flow charts showing the logic implemented in the preferred embodiment;

FIG. 6 is a block diagram showing a data structure for an effect object;

FIG. 7 is a block diagram showing a data structure for a process list effect object;

FIG. 8 is a block diagram illustrating an example of the data structure for a process list effect object; and FIG. 9 is a block diagram showing an example of a data structure for a play list.

DESCRIPTION OF THE PREFERRED EMBODIMENT

Haptic Joystick and Overview of Force Feedback System

Figure 1:
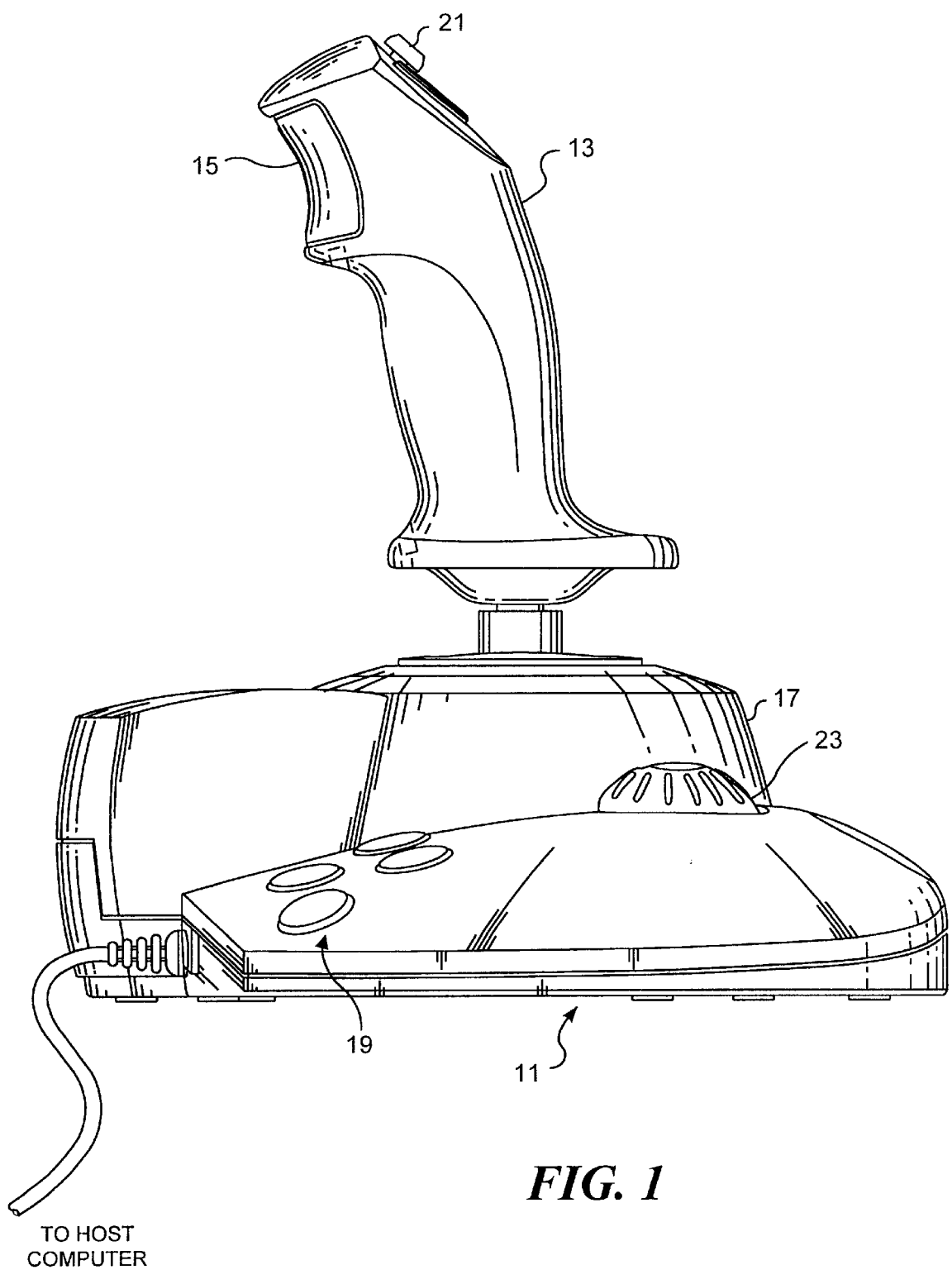
FIG. 1 is a side elevation view of a haptic joystick in which a preferred embodiment of the present invention is embodied.

With reference to FIG. 1, a force feedback (haptic) joystick 11, which is employed to simulate the sense of touch for a user in a virtual environment or in games illustrated, as a typical application of a preferred embodiment of the present invention. Joystick 11 includes a control handle 13 that is gripped by a user and which is able to pivot in two dimensions (X and Y axes) and rotate about the Z axis. The haptic joystick includes a trigger switch 15, a plurality of push button switches 19, a hat switch 21, and a rotatable control knob 23 (which is typically used for a throttle control). Other switches provided on the haptic joystick are not shown in this view. To achieve the sense of touch and/or feedback related to control actions initiated by the user a force is generated by direct current servo motors that are disposed in a base 17 of the joystick. The force (relative to either or both the X and Y axes) is transmitted through control handle 13 and is thus experienced by the user.

Figure 2:
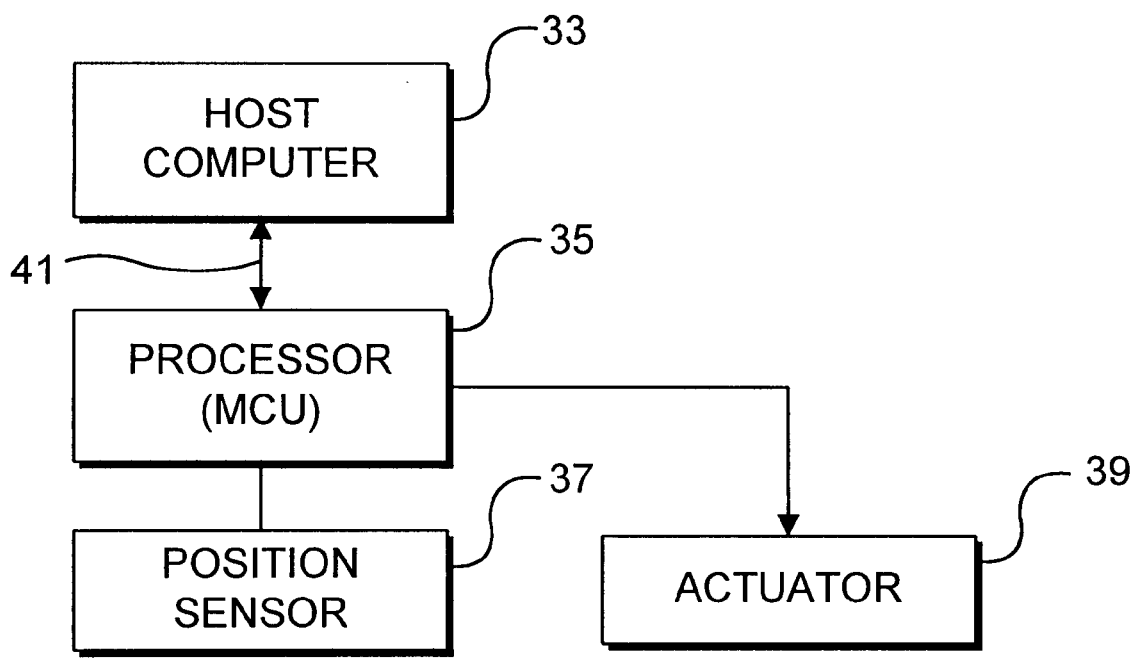
FIG. 2 is a system overview block diagram of the preferred embodiment.

In FIG. 2, a general overview of a force feedback system 31 that includes haptic joystick 11 is illustrated. A host computer 33 is coupled to a processor 35. Processor 35 may comprises a microcontroller unit (MCU), as is the case in the preferred embodiment as discussed below, or may comprise a microprocessor or central processing unit with additional discrete components, such as memory, analog-to-digital converter (ADC), etc. that are included in the single integrated circuit employed for the MCU. Commands from the host computer and the responses from the processor are transmitted through a communication link 41. Host computer 33 transmits the parameters for force effects and indicates the effects that are to be rendered by processor 35 over this communication link. The drive signals resulting from the processor rendering the force effects are supplied by processor 35 to an actuator 39 that generates a haptic force for transmission to the user. A position sensor 37 is coupled to processor 35, so that signals indicating the position of the joystick control handle are provided to the processor and transmitted to the host computer.

Whenever an application executing on host computer 33 employs force effects, the host computer will typically download force profiles (data structures and parameters) for the force effects supported by the application to processor 35. Typically, the downloading operation can be accomplished when the application is initiated. Once the force effect profiles are downloaded to the haptic joystick, the processor associates an ID number with each force effect. An ID number may represent a combination of several force effects, as explained in greater detail below. The ID number is provided by processor 35 to host computer 33. When the application requests a force effect to be rendered so that the user can experience it, host computer 33 will indicate to processor 35 the ID number and any parameter modifications necessary to render the force effect identified by the ID number. In this manner, the bandwidth required of communication link 41 between host computer 33 and processor 35 is minimized, and the computational load on the host computer to handle haptic force effects is minimal. Although the preferred embodiment provides that processor 35 generate the ID number for each force effect and communicate it to host computer 33 in association with specific profile data for the force effect, the ID number could alternatively be pre-assigned by the host computer and communicated to the processor. A third alternative would be to employ a shared algorithm executed by both host computer 33 and processor 35 so that each independently determines the same ID numbers that are assigned to all of the force effects. In any case, it is essential that each force effect be assigned an ID number that is employed in all references to the force effect communicated between processor 35 and host computer 33, so that the identifier is consistently applied.

Details of Haptic Joystick Circuit

Figure 3:
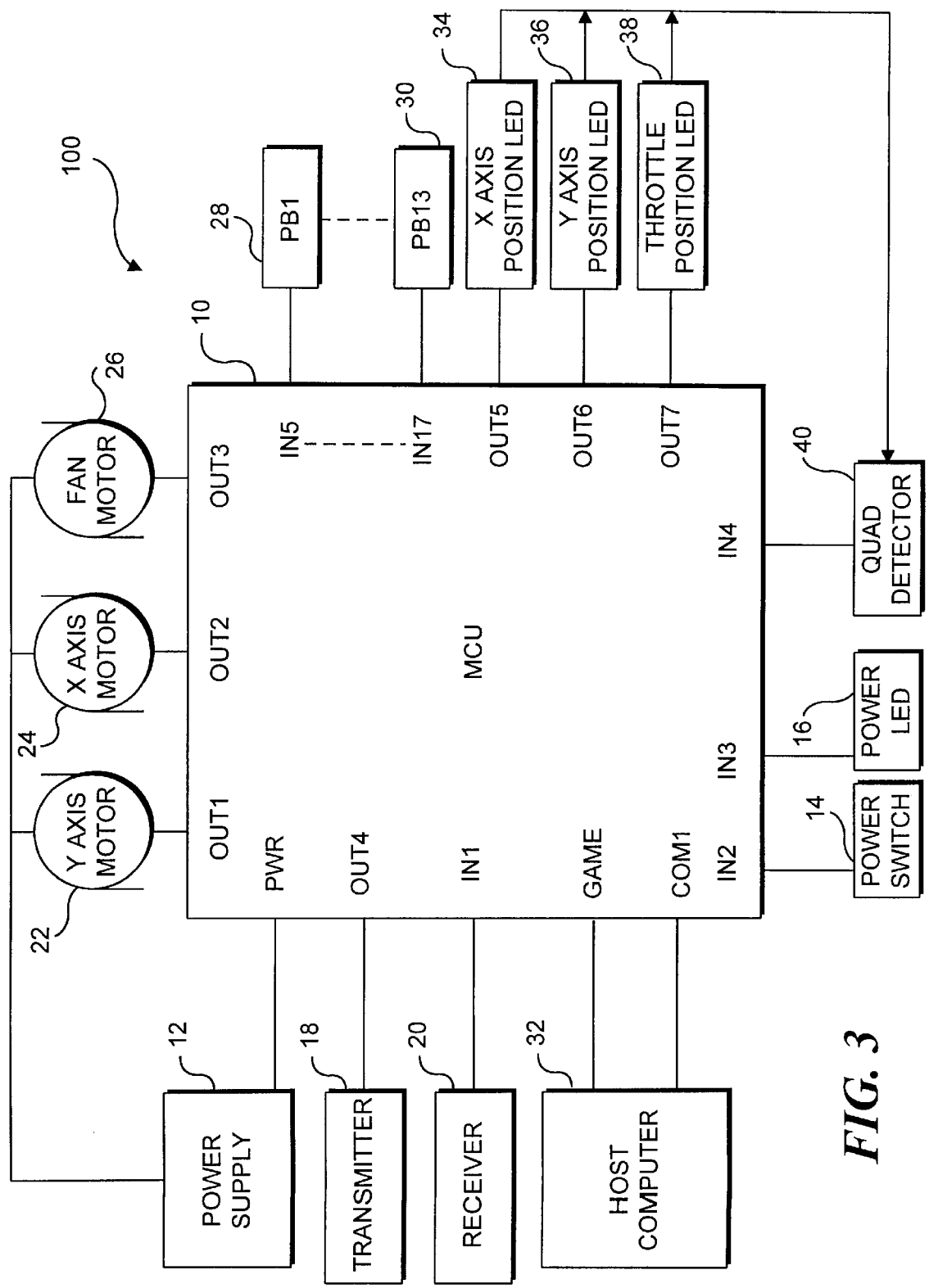
FIG. 3 is a general overview, schematic block diagram of a preferred embodiment of the present invention.

A circuit 100, which is used in controlling haptic joystick 11, is shown in FIG. 3. With reference to this figure, a power supply 12 is coupled to a PWR input of a MCU 10 (which corresponds to processor 35 in FIG. 2). A power switch 14 is coupled to an IN2 input port of MCU 10 to enable the user to energize MCU 10 and the other associated electrical components in the haptic joystick. Further, a power LED 16 is coupled to an IN3 input port of MCU 10 and is illuminated whenever switch 14 is engaged. To detect when the user has gripped the handle of the joystick, an optical switch having a transmitter (i.e., a light source) 18 and a receiver (i.e., a light sensor) 20 is provided. An OUT4 output port of MCU 10 is coupled to transmitter 18, and an IN1 input port of the MCU is coupled to receiver 20. A program stored within a read-only memory (ROM—not separately shown) included within MCU 10 responds to a change in the output signal from the receiver caused by the user's hand blocking the light path between the transmitter and the receiver to determine when the user is gripping the handle of the joystick.

A Y axis DC servo motor 22 and an X axis DC servo motor 24 are coupled to an OUT1 output port and an OUT2 output port of MCU 10, respectively. A fan motor 26 is coupled to an OUT3 output port of MCU 10, for cooling the components of circuit 100 to prevent overheating. A host computer 32 is coupled to MCU 10. A cord (not shown in FIG. 3) extends from haptic joystick 11 to the game port and the COM1 communication port of the host computer. It is also contemplated that the USB port of newer computers can be used for the communication path between the host computer and the MCU instead of the game port and the COM1 port.

The game port is used by MCU 10 to transmit a digital signal indicating the orientation and/or rotational position of the joystick control handle and other status messages to an application running on host computer 32. The game port's button lines are employed to transmit data and clock values in a digital protocol. The COM1 communication port is bi-directional and is used for sending command responses from the haptic joystick to the host computer, and for transmitting commands from the host computer to the joystick. For example, a force effect command is provided by host computer 32 to MCU 10 through the COM1 communication port. In the preferred embodiment, the COM1 communication port initially employs the Musical Instrument Digital Interface (MIDI) protocol to communicate with host computer 32.

Additionally, MCU 10 can detect a special "dongle" signal state on the game port when it is coupled to the host computer. The special state indicates to MCU 10 that a serial interface protocol instead of the MIDI protocol should be employed by the COM1 communication port for transmitting data to the host computer. When the special state is detected, MCU 10 automatically switches the functionality of the COM1 port to that of a standard serial interface protocol, such as RS-232. In conjunction with the game port, the serially configured COM1 communication port will perform substantially the same functions as provided by the MIDI protocol. Further, the serial interface protocol will transmit data bi-directionally through the COM1 communication port at a rate of at least 38.4 kilobits per second. In this way, the user can enjoy the haptic joystick with operating systems or sound cards that may not support the MIDI protocol in a manner necessary for proper operation of the present invention.

A force effect is typically scheduled and rendered in accord with machine instructions (a software program) executed by MCU 10. This program is stored in the ROM within the MCU. Effect data and other variables are loaded into random access memory (RAM), which is also included within the MCU. A force effect is rendered when the equation or other data defining the parameters of the force effect are applied to generating a drive signal that is applied to drive Y-axis DC servo motor 22 and/or X axis DC servo motor 24, causing the motor(s) to produce a corresponding force that is applied to the control handle of the haptic joystick. The rendered effect is thereby experienced by a user of the joystick as a force that acts on the user's hand, through the control handle.

An X-axis position LED 34 and a Y-axis position LED 36 are respectively coupled to an OUT5 output port and an OUT6 output port of MCU 10. Further, a throttle LED 40 is coupled to an OUT7 output port of MCU 10. The light emitted by the X-axis position, Y-axis position, and throttle LEDs are time multiplexed and are incident upon a surface of a quad position detector 40. The position detector responds to the light received from each of these LEDs in four quadrants, producing sensor position signals that are multiplexed and applied to the IN4 input port of MCU 10. The program executed by MCU 10 uses the multiplexed position signals to determine the exact disposition of the joystick handle and the throttle. Significantly, the program determines the X-axis, Y-axis, and rotational positions of the joystick handle using only two LEDs.

Prior art haptic joysticks typically use springs or elastic bands to center the control handle when the user or a force effect is not displacing the control handle. Instead of using springs, haptic joystick 11 employs the X-axis and Y-axis DC servo motors to apply a centering force to the control handle. Quad detector 40 senses the position of the control handle and its displacement relative to the centered position. MCU 10 then provides the drive signal to the two DC servo motors to center the control handle. Clearly, when a force effect is being applied, the force applied by the DC servo motors may displace the control handle from the centered position. But more typically, while the user grips the control handle, any displacement of the control handle from the centered position by the user will cause the MCU to command the DC server motor(s) to provide a force acting on the control handle for one or both of the axes along which the displacement occurred, and this force will tend to restore the control handle to the centered position. To the user, moving the control handle away from center position will typically result in a force being applied that tends to oppose the movement until the control handle is again centered. The restoring force can be the result of rendering a force effect and thus may appear as a conventional spring force, a non-linear positive or negative force, or a more complex force. When no other force effect is being applied by an application, the default will thus be a centering spring force effect corresponding to that which the user would expect if the joystick were centered by springs instead of by the force applied by DC servo motors 22 and 24. The centering spring force effect is defeatable for a maximum force dynamic range over all control handle positions.

In the preferred embodiment, thirteen switches/push buttons, PB1 switch 28 through PB13 switch 30, are respectively coupled to IN5 through IN17 input ports of MCU 10. The switches are configured as follows: (a) a trigger switch disposed on the joystick's handle, i.e., to trigger 15 in FIG. 1; (b) three switches mounted on the joystick's control handle; (c) five push button switches 19 disposed on base 17 of the joystick, one of which functions as a shift key; and (d) four switches that comprise hat switch 21, which is also disposed on the joystick's control handle. In the preferred embodiment, MCU 10 is a 25 megahertz, 16-bit microcontroller that includes 48 kilobytes of ROM, 2 kilobytes of RAM, eight analog-to-digital (A-D) converter input ports, and a plurality of digital input and output ports. The A-D converter ports are used for determining the position of the control handle, sensing the power provided by the power supply, providing a dead man switch, and for centering and calibrating the position of the control handle. Also, the signals produced at the OUT1 and OUT2 output ports are pulse width modulated (PWM), so that MCU 10 exercises extremely accurate control of the force generated by X axis DC servo motor 22 and Y axis DC servo motor 24.

Logic Employed in Rendering Force Effects

An important aspect of the present invention is the technique used for controlling the rendering of force effects transmitted through the control handle to the user. The present invention uses a scheduler implemented in software by MCU 10 to control the rendering of force effects. The logical steps implemented by the scheduler for ordering and timing force effects that are transmitted to the user are shown in FIG. 4. Beginning at a start block, the logic advances to a block 102 in which the current value of a servo clock is fetched. Like most processing devices, MCU 10 includes a time base that is used for all timing functions. In the present invention, the time base is employed to determine a tick of the servo clock when rendering force effects. Also, the current servo clock value is initially stored when MCU 10 is energized. In a decision block 104, a determination is made as to whether the difference between the current servo clock value and the stored servo clock value is greater than a tick of the servo clock, which in the preferred embodiment, is two milliseconds. If the difference is not greater than this time interval, then the procedure continues to loop through block 102 until an affirmative determination is made at decision block 104. Once one servo clock tick has elapsed, the logic steps to a block 105 where the current value of the servo clock is stored. Next, in a block 106, the position values for the control handle are stored. The signals from quad detector 40 are multiplexed and used to determine an indication of the X-axis, Y-axis, and rotational position of the control handle. After storing these values, the logic advances to a block 108 to determine velocity values for the control handle based upon changes in the stored position values relative to the values that were stored two milliseconds earlier. The stored position values and velocity values are filtered to reduce errors induced by noise. Further, the filtered velocity values are employed to determine acceleration values for the control handle, which are stored, by determining the changes in the velocity of the control handle relative to the previous velocity values that were determined two milliseconds earlier.

Once the filtered position, filtered velocity, and acceleration values are stored, the logic advances to a block 110 and the status of the push buttons and the miscellaneous switches associated with the joystick are updated for a button list that employs an activity table to indicate the push buttons and the switches that are currently actuated. The logic moves to a block 112, and a data packet is built for transmission to the host computer. The data packet contains the position values that were just stored and the status of the push buttons and switches and is built following each servo clock tick, even if the host computer does not request MCU 10 to provide the data packet.

The logic moves to a block 114 and the status of the interlock (dead man optical switch) is stored. The interlock status depends upon whether the optical path between transmitter 18 and receive 20 is blocked. The logic steps to a block 116 and queued host computer commands and device responses are parsed. Block 116 is presented in greater detail in the discussion of FIGS. 5A and 5B below. The logic then advances to a block 118, in which any force effect that is associated with an actuated push button or switch on the button list is rendered and the force effects resulting from the rendering are summed. For example, if the user actuates trigger 15 to fire cannon on a jet fighter in a "dog fight" simulation game application, a feedback force effect associated with the cannon in a button list will be rendered so that the resulting force may be applied to the control handle. The logic advances to a block 120 in which any force effects on the play list that are scheduled for the current servo clock tick are rendered and summed.

Next, in a decision block 122, a determination is made as to whether the user is gripping the handle of the joystick. If the user is gripping the handle, the optical path will be blocked and the generation of force effects will be enabled. In contrast, when the optical path is not blocked by the user gripping the handle, the generation of force effects will be disabled, causing the logic to return to block 102. If the determination in decision block 122 is true, the logic proceeds to a block 124. The rendered and summed force effects from both the button list and the play list are added together to create a total summation of force effects that is rendered to develop the drive signal for the X-axis and Y-axis DC servo motors. Finally, the logic loops back to a block 102 to start determining the force effect(s) produced during the next servo clock tick.

Turning now to FIG. 5A, the parsing step implemented in block 118 is presented in greater detail. Moving from the start block, the logic advances to a decision block 126, and a determination is made as to whether a command queue for receiving commands from the host computer is empty. The command queue has a circular first in first out (FIFO) data structure. In the preferred embodiment of the present invention, the command queue is eight bytes in length and is emptied at every servo clock tick (every 2 milliseconds). If the determination at decision block 126 is true, the logic jumps out of the parsing routine and returns to the main logic flow of FIG. 4. If the command queue is not empty, the logic advances to a block 128, and the first data item (byte) in the command queue is moved into the command buffer.

The command buffer can hold up to 128 bytes of data items, so that extremely complex commands can be passed from host computer 32 to MCU 10. However, most host commands are relatively short in length. Although a command to create a sine wave force effect may consume as much as 30 bytes in the command buffer, another command to modify or execute a sine wave force effect that has already been downloaded may requires as few as three bytes. Thus, after the host computer has initially downloaded the force effect profiles e.g., the data structures and parameters that define the force effects not stored in ROM, the commands between the host computer and the processor to control rendering of the force effects are usually provided in one servo clock tick.

Next, in a block 129, the command buffer write pointer is incremented. Each command has a pair of read and write pointers for the command buffer. The write command buffer pointer is incremented each time a data item is written to the command buffer. The read command buffer pointer is incremented as each data item is read out of the command buffer for execution. In this way, when the values of the read and write pointers are equal to each other and greater than zero, a check is provided to ensure that a command that was written into the command buffer was also successfully read out of the buffer.

In a decision block 130, a determination is made as to whether the data item contains the op codes (first byte) of a new command. If true, the logic moves to a block 132, and the new command flag is set to true. Looping back to decision block 126, another determination is made as to whether the command queue is empty. If not, the logic advances to block 128, which provides that the next first data item in the command queue is stored in the command buffer. If the determination at decision block 130 is negative, the logic moves to a decision block 134, and another determination is performed to decide whether the command in the command buffer is complete, i.e., whether the current data item is the last byte in the command. If not, the logic will loop back through decision block 126 until the determination at decision block 134 is true.

Once the command in the command buffer is determined to be complete, the logic moves to a decision block 136, in which a determination is made as to whether the command is being transmitted through the MIDI channel that has been assigned for communicating data between the host computer and the joystick. This determination serves to filter out MIDI commands, such as music synthesizer commands, that are not intended for MCU 10. If the determination at decision block 136 is false, the logic moves to a block 138 in which the read and write pointers for the command buffer are set to zero. Next, in a block 124, the new command flag is set to false. The logic again flows to decision block 126 so that the program may determine whether any commands remain in the host command queue.

If the determination at decision block 136 is affirmative, the program advances to a block 140 as shown in FIG. 5B. The sanity of the command is checked by comparing the command op code in the first byte of the command with a lookup table of valid commands for the joystick. The logic moves to a decision block 142, and a determination is made as to whether the command op code of the new command was found in the look up table of valid commands. If not, the logic moves to a block 148, and a negative acknowledgment (NACK) response is placed in the device (joystick) response queue, which is immediately transmitted to host computer 32. The logic jumps to a block 124, as shown in FIG. 5A. In block 124, the new command flag is set to false. Next, the logic steps to block 126 and the logic flow starts over, as previously explained in regard to FIG. 5A.

If the determination in decision block 142 of FIG. 5B is true, the logic advances to a block 144. The sanity of the data in the command is evaluated by performing a check sum on the command and determining if the correct number of bytes for the command are present in the command buffer. In a decision block 146, the logic determines whether the command is sane, i.e., whether the command passed both of the data sanity checks. If not, the logic moves to a block 148, and a NACK response is placed in the device response queue for transmission to host computer 32. If the determination is true, the logic advances to a block 150, which provides that the command in the command buffer is executed. As each data item in the command buffer is executed, the read command buffer pointer is incremented. Next, the logic moves to a decision block 151 to determine whether the command failed to execute. The values of the read and write command buffer pointers are compared to determine whether the correct number of bytes were read from the command buffer during execution of the command. If the pointers do not have the same value, the logic moves to block 148, and a NACK response is placed in the device response queue for transmission to host computer 32. However, if the read and write command buffer pointers have the same value, the logic moves to a block 152, and a positive acknowledgment (ACK) response is placed in the device response queue. Once the ACK response is transmitted to host computer 32, the logic jumps to block 124 (in FIG. 5A). The new command flag is set to false and the logic flows to decision block 126 so that the logical steps of method 100 can begin anew.

The ACK and NACK responses in the device response queue are sent to the host computer on the same MIDI channel on which the commands are received by MCU 10 for the host command queue. Since the device response queue is just large enough (8 bytes) to contain slightly more than two ACK/NACK responses (6 bytes) at a time, the responses are sent to the host computer after each data item is determined by the MCU. The MIDI protocol is capable of transmitting 6.25 bytes of data to the host computer every two milliseconds (servo clock tick). Also, the size of commands, ACK/NACK responses and diagnostic messages are at least three bytes long. Consequently, no more than two responses are queued in the device response queue per servo tick, and the small size of the device response queue does not create an overflow problem. In contrast, each game port data packet built for the host, which contains the position values and the button/switch status values, is only transmitted by the MCU to the host computer upon request.

A watchdog timer is employed to determine if the rendering of a force effect by the haptic joystick has exceeded a predetermined length of time (forty milliseconds in the preferred embodiment). If the execution of a command is determined to consume more time than forty milliseconds, it is likely that the rendering and generation of the force effect has failed, and the logic will immediately interrupt the execution of the program and reset the processor contained within MCU 10 so that the logic flow may again start implementing the steps of the scheduler.

Exemplary Command Set

In the preferred embodiment, a plurality of commands are executed by the program represented by the logic in FIGS. 4, 5A, and 5B, and an exemplary partial list of the valid commands is provided in Table 1, below.

TABLE 1

Command Set

| Effect | Playback | Utility | Effect Manipulation | Manufacturing |
| --- | --- | --- | --- | --- |
| PutForce | Play Effect | Change MIDI channel | Destroy Effect | Force Query |
| Constant | Stop Effect | Effect Play Status | Set Effect Parameter | Test |
| Spring | Button Play | Reset All | Index | Debug |
| Bumper | | Reset Forces On | Modify Effect | |
| Damper | | Reset Forces Off | Parameter | |
| Friction | | Shutdown | | |
| Inertia | | | | |
| Wavetable | | | | |
| Romtable | | | | |
| Synth | | | | |
| Delay | | | | |
| Process | | | | |

The command set provided in Table 1 above clearly illustrates at least five different types of commands: effect, playback, utility, effect manipulation, and manufacturing. The diverse command set enables the present invention to implement a wide variety of force effects and system procedures that are transmitted by host computer 32 to MCU 10.

The Scheduler and Classes of Force Effects

The scheduler, which is implemented in software executed by MCU 10, is primarily responsible for enabling the haptic joystick to render force effects that are requested by the host computer. The scheduler has a round robin queue for executing a play list that orders the playback of force effects. There are five classes of force effects: behavior, synthesized, wave table, variable parameter, and process list. Each class of effects has at least one parameter that is modifiable by the host computer and other characteristics that distinguish one class of force effect from another. Behavior force effects have force profiles that employ the position, velocity, and/or acceleration values to generate a force effect. These values are determined by MCU 10 in response to the movement of the control handle by the user. For example, friction, damping, inertia, springs, and constant forces are all behavioral effects that are produced in response to the user moving the control handle of the haptic joystick. Thus, behavior effects are particularly well suited to simulating force effects that are associated with movement of a virtual object within a virtual world.

Synthesized effects are rendered by MCU 10 as a function of mathematical formulas that are time variant. The synthesized effect formulas include polynomials, transform coefficients, sine, cosine, and triangular wave forms. The parameters that are modifiable by the host computer for a synthesized effect include direction, frequency, and envelope (a time varying amplitude of the force effect).

Wave table force effects are rendered by MCU 10 based on arbitrary profiles that are stored in a table within the RAM or ROM of the MCU. These force effects are similar to synthesized effects and differ only in the manner that the force data is obtained for a given servo tick. Although any wave table force effects downloaded from the host computer are stored in RAM, predefined wave table force effects are stored in ROM within MCU 10. Since a push button or a switch are capable of being mapped to any class of force effect, they may even be mapped to a wave table effect stored in either RAM or ROM. A partial list of wave table force effects stored in ROM, ROM ID numbers assigned to each, and the parameters (output rate, gain, and duration) applicable to each are provided in Table 2 below.

TABLE 2

ROM Table Force Effects

| Name | ROM ID | Output Rate | Gain | Duration |
| --- | --- | --- | --- | --- |
| Random Noise | 1 | Any | Any | 12289 |
| Aircraft Carrier Take Off | 2 | 100 | 100 | 2625 |
| Basketball Dribble | 3 | 100 | 50 | 166 |
| Car Engine Idling | 4 | 100 | 14 | 10000 |
| Chainsaw | 5 | 100 | 30 | 1000 |
| Chainsawing Things | 6 | 100 | 100 | 1000 |
| Diesel Engine Idling | 7 | 100 | 40 | 10000 |
| Jump | 8 | 100 | 100 | 348 |
| Land | 9 | 100 | 100 | 250 |
| Machine Gun | 10 | 200 | 100 | 1000 |
| Punched | 11 | 100 | 100 | 83 |
| Rocket Launcher | 12 | 100 | 100 | 1000 |
| Secret Door | 13 | 100 | 98 | 500 |
| Switch Click | 14 | 100 | 66 | 25 |
| Wind Gust | 15 | 100 | 75 | 500 |
| Wind Sheer | 16 | 100 | 100 | 2500 |
| Pistol | 17 | 100 | 100 | 50 |
| Shotgun | 18 | 100 | 100 | 295 |
| Laser 1 | 19 | 500 | 95 | 1000 |
| Laser 12 | 20 | 500 | 96 | 1000 |
| Laser 2 | 21 | 500 | 100 | 1000 |
| Laser 22 | 22 | 500 | 100 | 1000 |
| Laser 3 | 23 | 500 | 100 | 1000 |
| Laser 32 | 24 | 500 | 70 | 1000 |
| Out Of Ammo | 25 | 100 | 100 | 25 |
| Lightning Gun | 26 | 100 | 71 | 1000 |
| Missile | 27 | 100 | 100 | 250 |
| Gatling Gun | 28 | 100 | 100 | 1000 |
| Short Plasma | 29 | 500 | 97 | 250 |
| Plasma Cannon 1 | 30 | 500 | 100 | 500 |
| Plasma Cannon 2 | 31 | 500 | 99 | 625 |
| Cannon | 32 | 100 | 100 | 440 |
| Flame Thrower | 33 | 100 | 68 | 1000 |
| Bolt Action Rifle | 34 | 100 | 100 | 75 |
| Crossbow | 35 | 500 | 100 | 31 |
| Sine | 36 | Any | Any | 1000 |
| Cosine | 37 | Any | Any | 1000 |

The fourth class of force effects, variable parameter, includes combinations of the behavior, synthesized, and wave table force effects discussed above. The parameters of the combined force effects can be variables that change over time, as a function of a mathematical formula or according to the disposition of the joystick's control handle. Examples of variable parameter force effects include use of a sine wave to modulate the amplitude of a spring, and a wave table effect that becomes stronger as the velocity with which the joystick control handle is moved increases. It is highly desirable to enable the parameters of a force effect being rendered to be varied by the MCU instead of the host computer. If the host computer were required to vary the parameter in real time and provide continuous updates to the processor, the task would significantly increase the computational load on the host computer.

It should be noted that the scheduler superimposes every force effect on the play list that is scheduled for the current servo clock tick, so that the MCU only renders the total of those force effects for the current tick. If a switch or push button associated with a force effect is actuated by the user, the ID number for that force effect will be entered on the play list and rendered by the MCU. Further, the time interval during which a force effect is applied will normally equal the time during which the switch/push button remains actuated.

Process lists, Play Lists, and Button Lists

Process list force effects are based on process lists that provide for the rendering of combinations of the first four force effect classes, i.e., behavior, synthesized, variable parameter, and wave table force effects. There are three types of process lists: superimposed, sequential, and concatenated. All of the force effects included in a superimposed process list are generated simultaneously. Significantly, superimposed process lists implement each force effect on the list according to the lifetime parameters of each force effect. In this way, force effects on the list may stop and start at different times so that the superimposition of all of the force effects on the list will only occur for that portion of the overall lifetime of the process list when all of the listed force effects are being generated. Any force effect included on the process list may terminate once the duration of the force effect specified in its parameters is completed and the other force effects can continue being generated.

A sequential process list provides for rendering and generating of the force effects included in the list sequentially, so that each successive force effect is generated only after the preceding force effect is completed. Significantly, each force effect retains the amplitude envelope specified in its parameters. A sequential process list always implements each force effect separately, until the specified duration of the force effect is complete. Only then will the next force effect on the sequential process list be rendered by the MCU and generated.

A concatenated process list is similar to a sequential process list because the force effects on the list are individually rendered and generated in the sequence in which they appear on the list. However, the concatenated process list also invokes an overall amplitude envelope that supersedes the individually defined amplitude envelopes of the force effects that are included on the list. Thus, the individual force effects in a concatenated process list are implemented sequentially under an overall amplitude envelope that may significantly modify the amplitudes indicated in the profile parameter for each force effect.

Furthermore, process lists can contain a nested reference to another process list. In this way, a plurality of process lists may be nested to create extremely complex force effects for rendering and generation. Process lists are similar to subroutine calls because they permit a complex combination of force effects to be invoked with a single command (ID number) that is assigned to the combination. Although a process list active on the play list is implemented by the scheduler at every increment (tick) of the servo clock, the process list employs its own process list clock to time out individual force effects on the process list after they have been rendered and generated.

A play list that is implemented by the scheduler can perhaps best be understood as a special case of a superimposed process list. The play list is a chronological ordering of all of the force effect IDs that have been indicated by the host computer for each tick of the servo clock. Since the play list is completely traversed for each servo clock tick, the actual force effect rendered by the MCU at a tick is the summation of all effects on the play list that are indicated for that time. Further, each force effect has an associated lifetime, and the time remaining for a force effect is computed for each traverse of the play list. Although force effects remain stored within the memory of the MCU for later use, the force effects originally on the play list that have timed out are marked inactive and removed from the list.

The host computer may modify a parameter of a force effect being generated, in real time, by sending a command to the MCU that includes a new parameter and the ID number for the force effect. However, force effects are not modified in mid-rendering by the MCU; instead, modifications in rendering are synchronously performed in the host command parsing routine. Also, force effects can be started and stopped when the host computer indicates the ID number of the force effect and the desired action. Whenever a force effect that was stopped is restarted before its lifetime counter has timed out, its lifetime counter will be restarted with the initial value stored before the interruption occurred.

As discussed above, the button list includes the status of actuated switches and push buttons and is maintained by the MCU separately from the play list. Typically, the button list contains ID numbers for force effects that are mapped to specific push buttons or switches in a one-to-one correspondence. However, a plurality of ID numbers corresponding to multiple force effects can also be mapped to a single switch or a push button. The host computer may indicate the mapping of the switches and push buttons or enable the user to selectively map desired force effects to particular push buttons or switches. Whenever the MCU detects that a push button or switch mapped to a force effect is engaged, the force effect is added to the play list and remains there until the push button or switch is disengaged. Thus, mapped effects are added to and removed from the play list whenever a change in the state (engaged/disengaged) of a push button or a switch occurs.

Examples of Force Effect Objects

In FIG. 6, a generic overview of a force effect object 168 is illustrated. A specific data structure 154 applied to a force effect object includes the force effect class in a block 156, a lifetime value in a block 160 and a data pointer 158. Block 156 is employed to indicate the class of the force effect, i.e., behavior, wave table, synthesized, or variable parameter. Data pointer 158 indicates an address in memory of a data structure 162 used for storing the parameters of a specific force effect, and data structure 162 includes a first parameter in a block 164 through an $n_{th}$ parameter in a block 166. An ID number is assigned to force effect object 168 when data structure 154 and data structure 162 are employed to create the force profile of a particular class of force effect.

Since the host computer employs the ID number to indicate a specific force effect for rendering by MCU 10, the host computer does not have to allocate the actual memory for storing an identification of the two data structures to indicate a specific force effect. Instead, MCU 10 has the task of translating an ID number for a force effect into corresponding storage locations for the data structures that apply to the force effect so that the force effect can be rendered. In this way, the computational overhead required of the host computer for indicating the rendering of force effects is dramatically reduced. Also, host computer 32 can update the values for the parameters contained within data structure 162 simply by sending a command that specifies the ID number for the relevant force effect and provides new value(s) for its parameters.

In the preferred embodiment, MCU 10 has predetermined storage locations in RAM for sixteen force effect profiles and sixteen ID numbers. The force effect profiles downloaded from host computer 32 to MCU 10 are provided in a particular order, so that the amount of RAM allocated by the MCU for storing force effect profiles may be conserved. Host computer 32 first provides the force effect profiles for all of the non-process list force effects to MCU 10, and the host computer receives the ID numbers assigned to each force effect after the profile is downloaded to the MCU. Next, host computer 32 employs the ID numbers provided by MCU 10 to identify the force effect profiles for any process list force effect that is downloaded to the MCU. An alternative embodiment of the present invention could provide for dynamically scaling the amount of RAM allocated for force effect profiles to match the number and type of force effect profiles downloaded by the host computer.

An overview of a process list object 169 is shown in FIG. 7. Process lists are a special case of a force effect object, because the lifetime value required for a force effect object is not applicable to a process list object. Although process list object 169 employs a general data structure 188 that identifies the class as a process in a block 190 and a data pointer 192, the lifetime value in a block 194 is thus not included. Instead, the lifetime of the process list object is determined by the values contained within a specific data structure 170 at the memory address indicated by data pointer 192. Significantly, an ID number may be associated with process list object 169 so that host computer 32 can indicate the process list to the MCU in the same manner as if it were a force effect object representing a single effect.

Data structure 170 includes the process type in a block 172, a plurality of effect indices, including an effect index 1 in a block 174 through an effect index n in a block 182, their associated lifetime values in blocks 176 and 184. The default values for the lifetimes are the values that were initially downloaded for the individual effect data structures. However, the lifetime values may be modified by the host computer from the default values. The process type in block 172 indicates how the effects identified by the list are to be rendered by the processor e.g., superimposed, concatenated, or sequential. An end of list flag 186 signifies that all of the effects indexed by the process list have been identified.

Moving now to FIG. 8, an expanded view of an exemplary process list object 169' is provided. General data structure 188 includes block 190, which identifies the class as a process list object. Data pointer 192 indicates the memory address of a specific data structure 170' for the process list object, and a block 172' indicates that the process list object is sequential. The effect index 1 in a block 174' indicates another specific data structure 154', and a block 156' of the specific structure specifies that the force effect class is a wave table. Although a lifetime value (75) in a block 160' is associated with data structure 154', a force effect lifetime in a block 176' determines the actual duration (lifetime) of the wave table effect on the process list. In this example, the process list lifetime value is 75 servo clock ticks, which is the same as the lifetime value of the wave table effect. However, if the values were different, the value of the force effect lifetime in block 176' would supersede the value of the lifetime in block 160' in determining the length of time on the process list that the wave table force effect will be produced.

Specific data structure 154' also includes a data pointer 158' that indicates a data structure 162' for storing the parameters of the wave table force effect. Data structure 162' begins with a parameter 1 in a block 164' and concludes with a parameter n in a block 166'.

A force effect index 2 in a block 178' points to another specific data structure 154", and a block 156" defines the force effect class to be a spring. Although a lifetime value (60) is indicated in a block 160" of data structure 154", a force effect lifetime value in a block 180' determines the actual duration (lifetime) of the spring effect on the process list. For this example, the process list lifetime is set at 50 servo clock ticks in block 180'. Thus, the force effect lifetime in block 180' will supersede the lifetime value (60) indicated by block 160", thereby shortening the actual duration of the spring effect on the process list.

End of list flag 186' indicates that the process list has been traversed, and that there are no more force effects on the list for rendering by the processor. Thus, whenever the host computer indicates the ID number for process list object 169' to the processor, the wave table force effect and the spring force effect will be rendered sequentially for 75 and 50 servo clock ticks (125 total ticks), respectively. It is envisioned that a plurality of force effect objects may be implemented by a process list that includes another nested process list simply by referencing the ID number assigned to the initial process list.

Turning now to FIG. 9, an overview of a play list object 200 is provided. A general data structure 214 of the play list object includes a plurality of force effect indices and force effect times. The data structure of a play list object is similar to that of a process list object, except that the play list object does not include a process type. Instead, play list object 200 includes a list of superimposed force effects. The play list (object) is traversed for each increment (tick) of the servo clock, and every force effect scheduled for a particular tick is rendered and summed. Starting with a force effect index 1 in a block 202 and finishing with a force effect index n in a block 210, each force effect that is scheduled for the current servo clock tick is identified. The values of the force effect times in a block 204 through a force effect time n in a block 212 are employed to determine the scheduling of the corresponding force effect indices. A force effect time includes a lifetime value for the force effect and may also include a start time. An end of list flag 216 is employed to determine when the play list has been completely traversed for each tick of the servo clock. All of the force effects determined for the current tick of the servo clock are accumulated, so that MCU 10 only renders the total of the force effects for the current tick.

Force effect index 1 in block 202 points to general data structure 188 for a process list, and the value of the first force effect time (200) in a block 204 is employed to determine the actual lifetime or duration of the process list defined by data structure 188, on the play list. The value of the first force effect time on the play list may be less than or greater than the total time of the force effect lifetimes on the process list. The explanation of data structure 188 set forth above also applies in this example.

Significantly, the play list force effect time supersedes the total amount of time indicated by the process list to render the force effect. Since the play list first force effect lifetime value (200) exceeds the lifetime of the indexed process list force effect (125), the process list will loop until the play list lifetime value expires.

A force effect index 2 in a block 206 points to a specific data structure 154''' for a synthesized force effect. A data pointer 158''' points to a data structure 162''' that includes the parameters for the synthesized force effect. The actual amount of time that the synthesized force effect is applied is determined by the value (50) in a block 208; this time always supersedes the value (60) of a lifetime value in a block 160''', if they differ. Thus, as described above, general data structure 214 is completely traversed by the scheduler for each tick of the servo clock, so that the force effect rendered by MCU 10 is generated as an accumulation of every force effect scheduled for the current tick of the servo clock.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A force feedback device that is responsive to a request from a host computer to generate a force effect, comprising:
   (a) a member adapted to be grasped by a user of the force feedback device;
   (b) a prime mover coupled to the member, said prime mover producing a force that acts on the member;
   (c) a processor coupled to the prime mover, said processor rendering the force effect to produce a drive signal that is coupled to the prime mover, causing the prime mover to generate a force corresponding to the force effect; and
   (d) a communication link coupling the host computer to the processor, the communication link conveying the request to render the force effect from the host computer to the processor, said processor determining whether the processor is linked to the host computer through a musical instrument digital interface port or through a serial port and automatically configuring the communication link to employ an appropriate one of a musical instrument digital interface protocol and a serial protocol to communicate with the host computer.

2. A force feedback device that is responsive to a request from a host computer to generate scheduled force effects, comprising:
   (a) a member adapted to be grasped by a user of the force feedback device;
   (b) a prime mover coupled to the member, said prime mover producing a force that acts on the member;
   (c) a processor coupled to the prime mover, said processor rendering the force effect to produce a drive signal that is coupled to the prime mover, causing the prime mover to generate a force corresponding to the force effects;
   (d) a scheduler implemented by the processor, said scheduler scheduling the force effects so that they are generated during time intervals requested by the host computer;
   (e) a communication link coupling the host computer to the processor, said communication link conveying the request to render the force effects from the host computer to the processor, for scheduling the force effects; and
   (f) a memory in which a profile of a force effect initially received from the host computer and a unique identifier that is assigned to said profile are stored, said scheduler receiving the unique identifier for each force effect requested by the host computer for use in scheduling the force effects, wherein the processor receives a plurality of force effect profiles from the host computer that are combined into a single force effect by the scheduler, said single force effect being assigned a unique identifier.

3. A force feedback device that generates force effects in accord with a schedule, comprising:
   (a) a force generator that responds to a drive signal by producing a force that acts on a member, said member transmitting the force to a user in contact with the member so that the user experiences a force effect;
   (b) a sensor that detects a position of the member and produces a signal indicative of the position, said signal being used in defining at least one of the force effects;
   (c) a memory for storing data that specify the force effects; and
   (d) a processor, coupled to the force generator, the sensor, and the memory, said processor executing machine instructions that are stored in the memory and carrying out a plurality of functions defined by said machine instructions, including determining when each force effect is initiated and a duration of each force effect in accord with the schedule, said processor rendering each force effect as specified by the data stored in the memory, and when a force effect is required by the schedule, providing a corresponding drive signal to the force generator, said processor storing profiles for the plurality of force effects in the memory and assigning unique identifiers to the plurality of force effects, each unique identifier being associated with a profile for a different one of the plurality of force effects, said processor rendering a force effect that is specified in the schedule by the unique identifier for said force effect, in accord with the profile for said force effect, wherein a plurality of profiles are combined to indicate a single force effect that is assigned a unique identifier.

4. A method for controlling a device that generates force effects, comprising the steps of:
   (a) storing data that define the force effects in a memory of the device;
   (b) creating a schedule of force effects that defines when each force effect that is included on the schedule should be initiated and a duration of each force effect;
   (c) as a function of the schedule, providing a drive signal that enables a force corresponding to the force effect to be produced by the device, so that the force effects are generated in accord with the schedule;
   (d) assigning a unique identifier to each force effect; and
   (e) specifying each force effect included in the schedule with the unique identifier for said force effect, wherein data specifying a plurality of force effects are combined to specify a single force effect, the combined single force effect being assigned a unique identifier.

5. A force feedback device that is responsive to a request from a host computer to generate scheduled force effects, comprising:
   (a) a member adapted to be grasped by a user of the force feedback device;
   (b) a prime mover coupled to the member, said prime mover producing a force that acts on the member;
   (c) a processor coupled to the prime mover, said processor rendering the force effect to produce a drive signal that is coupled to the prime mover, causing the prime mover to generate forces corresponding to the force effects;
   (d) a scheduler implemented by the processor, said scheduler scheduling the force effects so that they are generated during time intervals requested by the host computer; and
   (e) a communication link coupling the host computer to the processor, said communication link conveying the request to render the force effects from the host computer to the processor, for scheduling the force effects, wherein a concatenated force effect comprising multiple force effects that are executed sequentially is defined, each force effect having a force effect amplitude envelope, the concatenated force effect having a predetermined amplitude concatenation envelope, said predetermined amplitude concatenation envelope superseding said force effect amplitude envelopes so as to control an amplitude of the force effects that are executed sequentially.

6. A force feedback device that generates force effects in accord with a schedule, comprising:

(a) a force generator that responds to a drive signal by producing a force that acts on a member, said member transmitting the force to a user in contact with the member so that the user experiences a force effect;

(b) a sensor that detects a position of the member and produces a signal indicative of the position, said signal being used in defining at least one of the force effects;

(c) a memory for storing data that specify the force effects; and (d) a processor, coupled to the force generator, the sensor, and the memory, said processor executing machine instructions that are stored in the memory and carrying out a plurality of functions defined by said machine instructions, including determining when each force effect is initiated and a duration of each force effect in accord with the schedule, said processor rendering each force effect as specified by the data stored in the memory, and when a force effect is required by the schedule, providing a corresponding drive signal to the force generator, wherein a concatenated force effect included on the schedule comprises multiple force effects that are executed sequentially, each force effect having a force effect amplitude envelope, the concatenated force effect having a predetermined amplitude concatenation envelope, said predetermined amplitude concatenation envelope superseding said force effect amplitude envelopes so as to control an amplitude of the force effects that are executed sequentially.

7. A method for controlling a device that generates force effects, comprising the steps of:

(a) storing data that define the force effects in a memory of the device;

(b) creating a schedule of force effects that defines when each force effect that is included on the schedule should be initiated and a duration of each force effect; and (c) as a function of the schedule, providing a drive signal that enables a force corresponding to the force effect to be produced by the device, so that the force effects are generated in accord with the schedule, wherein a concatenated force effect included on the schedule comprises multiple force effects that are produced sequentially, each force effect having a force effect amplitude envelope, the concatenated force effect having a predetermined amplitude concatenation envelope, said predetermined amplitude concatenation envelope superseding said force effect amplitude envelopes so as to control an amplitude of the force effects that are produced sequentially.

8. A method for controlling a device that generates force effects, comprising the steps of:

(a) storing data that define the force effects in a memory of the device;

(b) creating a schedule of force effects that defines when each force effect that is included on the schedule should be initiated and a duration of each force effect;

(c) as a function of the schedule, providing a drive signal that enables a force corresponding to the force effect to be produced by the device, so that the force effects are generated in accord with the schedule; and (d) terminating a force effect if execution of a command invoking the force effect exceeds a predetermined time interval.

9. A force feedback device that is responsive to a request from a host computer to generate scheduled force effects, comprising:

(a) a member adapted to be grasped by a user of the force feedback device;

(b) a prime mover coupled to the member, said prime mover producing a force that acts on the member;

(c) a processor coupled to the prime mover, said processor rendering the force effect to produce a drive signal that is coupled to the prime mover, causing the prime mover to generate a force corresponding to the force effects;

(d) a servo clock, coupled to the processor and providing a tick at a predetermined time interval;

(e) a scheduler implemented by the processor, said scheduler scheduling the force effects so that they are generated during time intervals requested by the host computer;

(f) a communication link coupling the host computer to the processor, said communication link conveying the request to render the force effects from the host computer to the processor, for scheduling the force effects; and (g) a memory in which a plurality of force effect profiles, each having a unique force effect identifier, are stored, said host computer sending a plurality of force effect commands comprising a playlist, each of said force effect commands comprising timing information concerning when the commanded force effect is to be active and a force effect identifier corresponding to one of the stored force effect profiles, said processor evaluating said playlist at each servo clock tick to render a force effect that imparts forces to said member, said rendered force effect being a summation of all of the force effect profiles on the playlist that are active at that time.

10. The force feedback device of claim 9, wherein at least one of the plurality of force effect profiles stored in memory is initially received from the host computer.

11. The force feedback device of claim 9, wherein at least one of the plurality of force effect profiles is stored in non-volatile memory.

12. The force feedback device of claim 9, wherein the host processor can issue a combined force effect command simultaneously activating a plurality of stored force effect profiles with a single unique force effect identifier, said combined force effect command being mapped to a plurality of the stored force effect identifiers.

13. The force feedback device of claim 9, wherein the force effect profiles comprise data pertaining to force frequency, amplitude, and duration.

14. The force feedback device of claim 9, wherein the playlist comprises a series of force effect commands that are executed sequentially.

15. The force feedback device of claim 14, wherein for producing a concatenated force effect, each of the sequentially commanded force effects has a force effect amplitude envelope, the concatenated force effect having a predetermined amplitude concatenation envelope, said predetermined amplitude concatenation envelope superseding said force effect amplitude envelopes so as to control an amplitude of the force effects that are executed sequentially.

16. A method for controlling a device that generates force effects, comprising the steps of:

(a) storing data that define the force effects in a memory of the device;

(b) creating a schedule of force effect commands that defines when each force effect that is included on the schedule should be initiated and a duration of each force effect;

(c) as a function of the schedule, executing the force effect commands so as to provide a drive signal that enables a force corresponding to a commanded force effect to be produced by the device, so that the force effects are generated in accord with the schedule; and (d) performing a sanity check for each force effect command prior to its execution so that the force effect command is not executed unless it is found among a predefined set of valid force effect commands for the device.

* * * * *